INVENTORS
JACQUES ANDRÉ ISTEL
LEWIS BARTON SANBORN

ATTORNEYS

INVENTORS
JACQUES ANDRÉ ISTEL
LEWIS BARTON SANBORN
BY Kane, Dalsimer and Kane

ATTORNEYS

INVENTORS
JACQUES ANDRÉ ISTEL
LEWIS BARTON SANBORN
BY Kane, Dalsimer and Kane

ATTORNEYS

United States Patent Office 3,043,543
Patented July 10, 1962

3,043,543
PARACHUTES
Jacques André Istel and Lewis Barton Sanborn, Bedford, N.Y., assignors to Parachutes Incorporated, Bedford, N.Y., a corporation of New York
Filed Dec. 18, 1958, Ser. No. 781,280
8 Claims. (Cl. 244—152)

This invention relates to improved parachutes, and, more particularly, to non-oscillating parachutes possessing superior steerability, rotatability and directivity, while at the same time introducing to the art a radically new principle of parachuting.

The parachute technology has advanced to such an extent that the present-day jumper can control his descent by selectively determining his forward direction as well as rotation. In this connection, canopies are provided with openings to effect the desired rotatability, steerability and directivity. However, these canopies are limited in their response to effect desired movements; are not capable of being handled during descent to selectively vary the degree of such maneuverability and, at the same time, provide for selectively variable and optimum forward speed-to-rate-of-descent characteristics.

Accordingly, it is an object of this invention to provide a non-oscillating or stable parachute having optimum rotatability, steerability and directivity to thereby greatly enhance a chutist's ability to make a safe landing and one at a selected location with extreme accuracy.

Another object is to provide such improved parachutes which are also capable of functioning upon a radically new principle in the parachute art by employing the theory of aerodynamic lift to thus increase the horizontal directional component and simultaneously decrease the rate of descent.

A further object is to provide an improved parachute possessing superior maneuverability, while under the selective control of the chutist, by being capable of effecting and varying directional as well as rotational components of the canopy during its descent.

An important object is to provide an improved rotatable, steerable and directional parachute that minimizes opening shock and dampens oscillation by employing a canopy properly formed from relatively low porosity material.

Another important object is to provide an improved parachute possessing low opening shock, extreme maneuverability, stability, low landing shock and ease of maintenance and packing.

Other objects and advantages will become apparent from the following detailed description which is to be taken in conjunction with the attached sheets of drawings which illustrate several preferred forms of the invention wherein like characters represent like parts, and in which.

Figure 1:
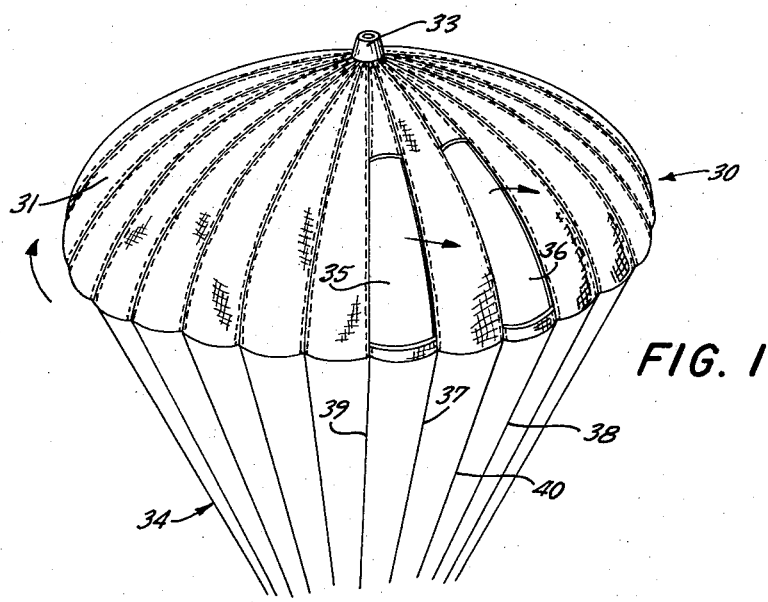
FIG. 1 is a perspective view of a parachute fabricated in accordance with the present invention and in an inflated condition with apron sectors of at least two gores removed.

In descent, parachute stability, steerability and rotatability are directly related to the action between the canopy and the air column down which the canopy descends. It is, of course, obvious that as the parachute descends the column of air is compressed beneath the canopy. Such compression acts to spill the air out of the canopy around its peripheral edge. If more air spills from one side of the canopy than the other, the parachute tends to swing in that direction and, thusly, produces what is commonly known in the art as oscillation. As will be appreciated, oscillation is extremely dangerous when the parachute approaches the ground and the difficulties in dampening such oscillation are increased manyfold.

It has been found that a parachute may be steered or controlled in descent by providing one or more canopy openings such that a jumper may be able to face the direction in which he is landing. In this connection, these canopy openings, when properly located at the rear sector of the usual canopy, will provide the element of directivity to the descending chutist. At this time, steerability or directivity of a parachute should not be confused with its rotatability, which is the ability to rotate the chute during descent notwithstanding its particular downwind direction generally followed by most descending parachutes. Rotatability of this kind has been accomplished once again by providing suitably located canopy openings.

As will be understood by those conversant in the field of parachutes, a portion of the air compressed beneath the canopy is ordinarily released therethrough by means of a puckered vent located at the apex thereof. The release of this air tends to stabilize the parachute to a small degree and acts to prevent rending of the parachute material, reduce opening shock and minimize extremely violent oscillation.

Under normal circumstances, a small percentage of the air contained within the canopy is permitted to pass through the canopy material. The amount of air which passes through the canopy material is dependent on the porosity of this material—the porosity being measured in cubic feet per square foot per minute, obviously there being a pressure difference between opposite forces of the canopy. Accordingly under the same pressure differentials some materials will pass more air than others and would be considered high porosity as compared to those not passing as much air. The velocity of the parachute's descent is related to the porosity and the amount of air which is permitted to pass through the various canopy openings or spilled from the canopy edges.

The teachings of the instant invention provide for an improved type of canopy which dampens and substantially eliminates oscillation, increases as well as selectively adjusts the rotatability of such parachutes, and presents optimum steerability and directivity of such parachutes, while—at the same time—supplying the additional component of lift during parachute descent.

Referring now to the drawings, a canopy—generally indicated by the numeral 30—is there shown. The canopy 30, which may be conveniently fabricated from silk, nylon or other suitable material, comprises a plurality of gores 31. Each of the gores forms a radial segment of the canopy 30 and are secured together by reinforced seams indicated by the numerals 1 through 28. In the language of the parachuting art, each of the gores 31 is identified and located with respect to the jumper by the seams defining the edges of the gores. Thus, the panel at the jumper's rear is defined as gore 1—28, while the panel at the jumper's front is defined as gore 14—15. The base portion of the panels 31 defines the skirt or outermost edge 32 of the canopy, said edge being reinforced by any means known to the art. The apexes of the panels 31 define the circumference of the apex or puckered vent 33 of the canopy, which may be formed in any manner common to the art. In general practice, the puckered vent is provided with a circumferential, reinforced seam having housed therein a rubber, or other flexible ring, which is adapted to expand or contract to permit the venting of air from the canopy thereby functioning to dampen oscillation and minimize opening shock. Shroud lines 34 extend through the center of the puckered vent 33 outwardly of the canopy 30, at opposite sides thereof, through seams 1 to 28 for conventional connection to risers (not shown) by means of connector links (not shown) which, in turn, are coupled with a harness or other load-carrying device (not shown).

Figure 2:
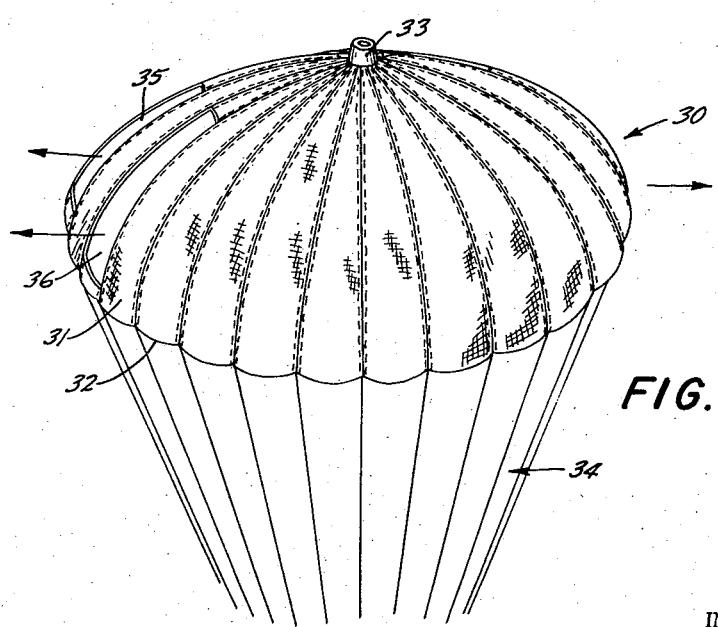
FIG. 2 is another perspective view of the same parachute taken from a different angle.
Figure 3:
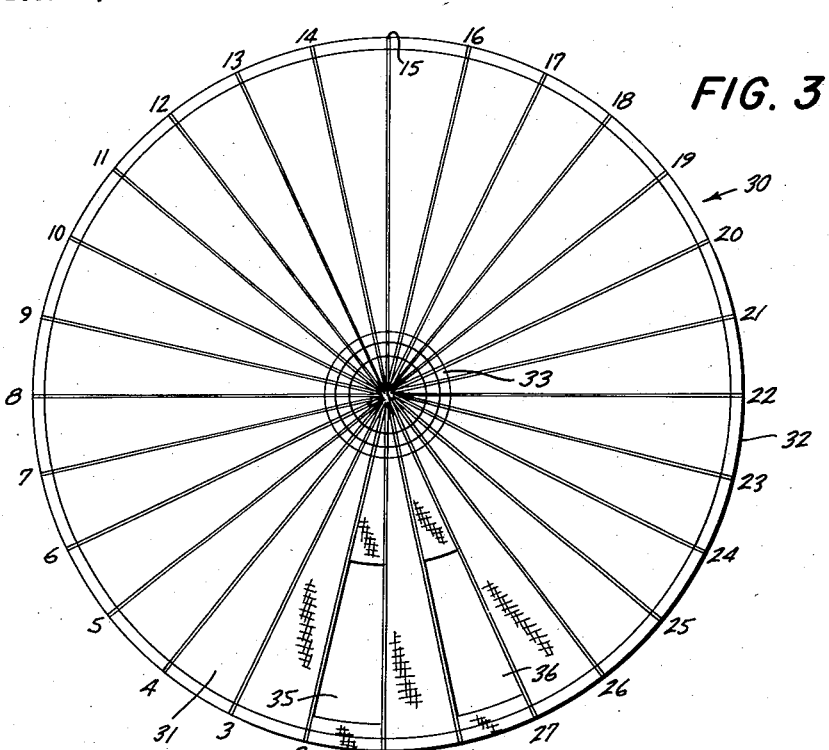
FIG. 3 is a top plan view of this parachute while in an inflated condition.

Reference is now made to FIGS. 1, 2 and 3 wherein the canopy 30 has an apron sector 35 of gore 1—2 removed and apron sector 36 of gore 27—28 similarly removed to thereby provide a plurality of partial gore openings. Naturally, as the gore opening length increases, the amount of air venting primarily in a vertical direction increases thereby resulting in an increase in the rate of descent. Since one of the objects of this invention is to obtain superior steerability and directivity resulting in a horizontal component of movement, it has been found that the gore opening should not extend for the entire gore length but preferably extending along the apron portion of the canopy 30 so that the venting of the compressed air within the canopy through these openings will result in predominantly a horizontal component of thrust as compared to a minimum vertical component of air venting, which naturally results in an increase in parachute descent. It has been found that with this increased area of canopy opening adjacent the peripheral edge of the canopy 30, the horizontal thrust is increased to such an extent that a component of lift is obtained, which naturally results in a decrease of vertical descent as is the case in normal aerodynamics.

As mentioned in the foregoing, it is also extremely desirable to have a canopy 30 respond relatively quickly to any selected magnitude of rotation inducing means. The desired degree of rotatability of canopy 30 is most effectively attained by the provision for the partial gore openings 35 and 36. In this connection, optimum rotatability in a clockwise direction, as viewed in FIGS. 1–3, is obtained by the jumper's pulling downwardly on the shroud lines 37 and 38. If a lesser rate of turn is desired, the jumper need only pull one or the other of shroud lines 37 and 38. Obviously, if a counterclockwise turn is desired, the jumper need only pull one or both of shroud lines 39 and 40 depending upon the rate of turn desired.

Naturally, with the increased area of gore opening, venting of the compressed air in a vertical direction supplements that provided by the puckered vent 33 to such an extent that optimum dampening is obtained and negligible oscillation is obviously the case.

The usual canopy materials possess a porosity ranging from 90 to 120 or from 130 to 160 cubic feet per square foot per minute. Naturally, as the effective areas of the canopy openings increase, the rate of descent increases. Therefore, it may be found desirable to decrease the porosity of the canopy material in an effort to decrease the rate of descent of the parachute and facilitate the operation thereof. The present invention contemplates canopy porosities ranging from about 20 to 50 cubic feet per square foot per minute, and even lower depending upon the selected canopy opening area. Under most circumstances, this relatively low porosity material is somewhat preferred in an attempt to obtain optimum steerability, directivity and rotatability of a descending parachute. Satisfactory results have been obtained with the subject parachute having two spaced trapezoidal gore openings 35 and 36 of a length substantially equal to about two-thirds of the effective gore length by using canopy material having a porosity of approximately 50 cubic feet per square foot per minute.

Figure 4:
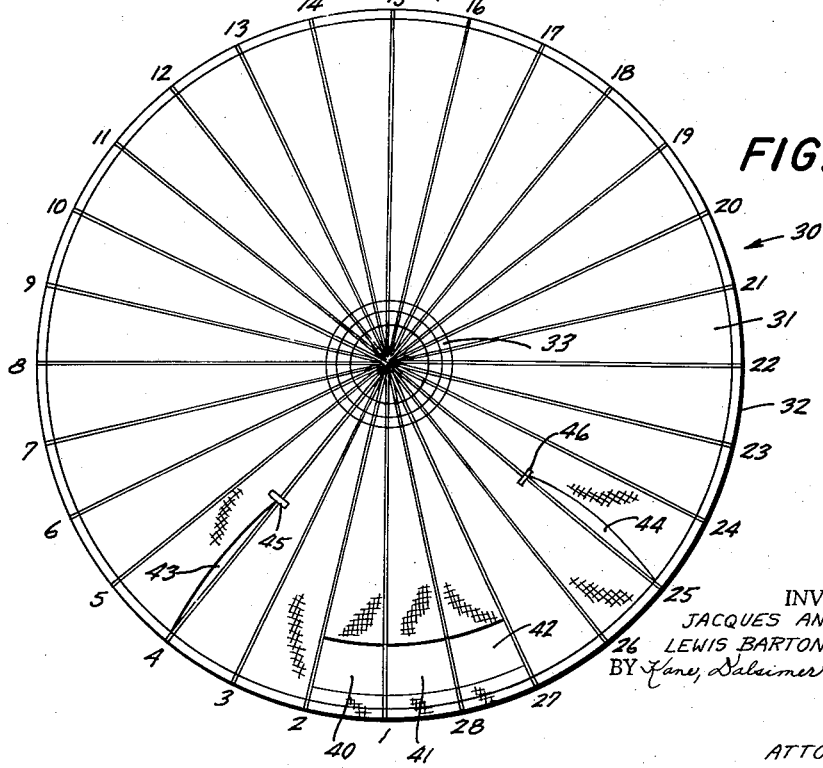
FIG. 4 is a top plan view of another embodiment of parachute in accordance with the present invention with apron sectors of several gores removed together with a pair of opposed slits.

Referring now to the embodiment illustrated in FIG. 4, it will be observed that the canopy 30 is provided with reduced sectors 40, 41 and 42 removed from gores 1—2, 1—28 and 27—28. The provisions of these partial gore openings 40, 41 and 42 permit horizontaly thrust of appreciable magnitude, thereby increasing the horizontal directional component of the canopy 30.

In an effort to increase the rate of turn or rotatability of the canopy and dampen oscillation of the subject embodiment, a pair of venting slits 43 and 44 are formed in the canopy. Venting slit 43 is adjacent and parallel to seam 4, whereas venting slit 44 is adjacent and parallel to seam 25. As illustrated, these venting slits 43 and 44 are formed on opposite sides of their associated seams 4 and 25. The venting slits 43 and 44, which are merely cuts in the canopy material, are reinforced by tape, or in any other manner known to the art, and extend from the skirt 32 radially inwardly towards the apex 33 of the canopy. The inner end of the venting slits 43 and 44 may be reinforced by reinforcing means such as tapes 45 and 46, respectively, extending transversely of their associated venting slits in an effort to prevent extension of these slits.

It should here be noted that the venting slits 43 and 44 are positioned at approximately 45 degree angles from the jumper's rear and that they extend substantially half the distance from the skirt to the apex of the canopy. It has been found that slits from about 6 feet to 8 feet in length are most effective with a canopy having a 28 foot diameter. The vent openings of the canopy 30 of this embodiment function to dampen oscillation and provide for a more stable descent. In the present embodiment the trapezoidal gore openings will extend for less than the entire gore length and should produce satisfactory results when approximately one-fourth the ordinary gore length.

Thus, in this embodiment various rates of canopy turn are possible by manipulating or pulling downwardly certain of the shroud lines 34 to obtain a maximum rate of turn in a clockwise direction, the converse being true if a counterclockwise turn is desired. In this connection, by pulling downwardly on the shroud lines coupled with seams 24, 1, 28 and 27 to vent or spill the compressed air from beneath the canopy 30 laterally through the affected canopy openings, a component of thrust is, accordingly, created which induces the desired clockwise rotation. If a slower rate of turn in a clockwise direction is desired, either the projected area on a vertical plane, provided by venting slit 44, or gore openings 40, 41 and 42 may be decreased depending on the circumstances.

Figure 5:
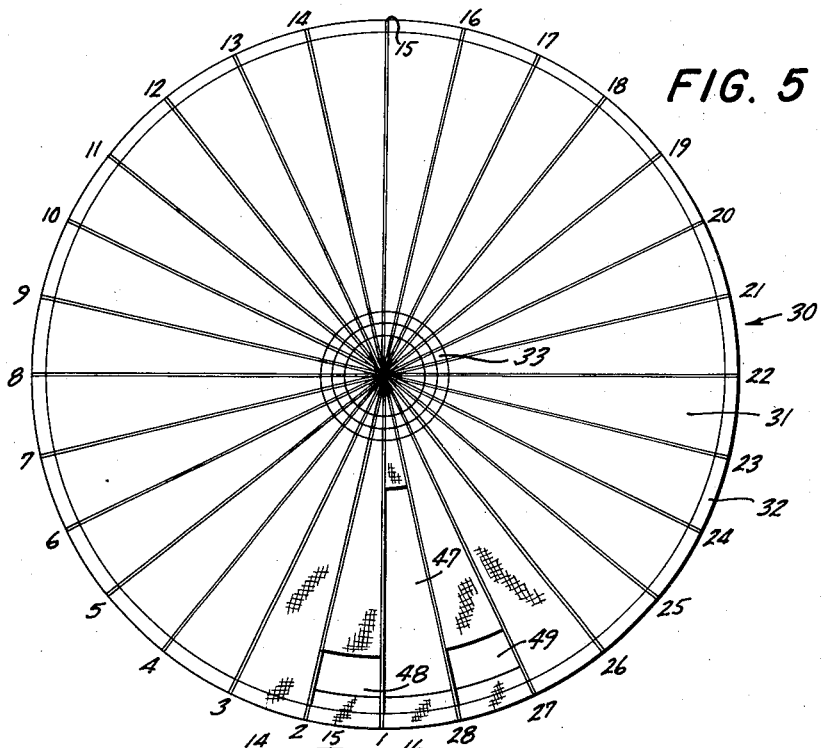
FIG. 5 is a plan view of still another embodiment of parachute with different apron sectors of adjacent gores removed.

In FIG. 5 a further embodiment of the present invention is illustrated wherein a substantially elongated gore opening 47 is interposed between immediately adjacent and somewhat reduced gore openings 48 and 49. Obviously, the provision of a somewhat elongated gore opening 47 results in an increased rate of descent. However, this is offset by the provision of the pair of adjacent and spaced gore openings 48 and 49, which provide for an increased component of horizontal thrust, thereby enabling the chutist to obtain a component of lift which will reduce the rate of vertical descent. An effective rate of turn is obtained by the present embodiment and is effected by simply pulling on the shroud lines coupled with the canopy seam 28 and 27 if a clockwise turn is contemplated. By proper manipulation of these shroud lines, the rate of turn may be varied from the maximum to that of any lesser amount. Conversely, if a counterclockwise turn is desired, the chutist need only pull down on the shroud lines coupled with the canopy seams 1 and 2.

The increased area of canopy openings will inherently dampen oscillation and provide for a more stable parachute. A suggested proportionment of canopy sectors will have the length of the elongated gore opening 47 approximately two-thirds of the effective gore length with the gore openings 48 and 49 approximately one-fourth the gore length.

Figure 6:
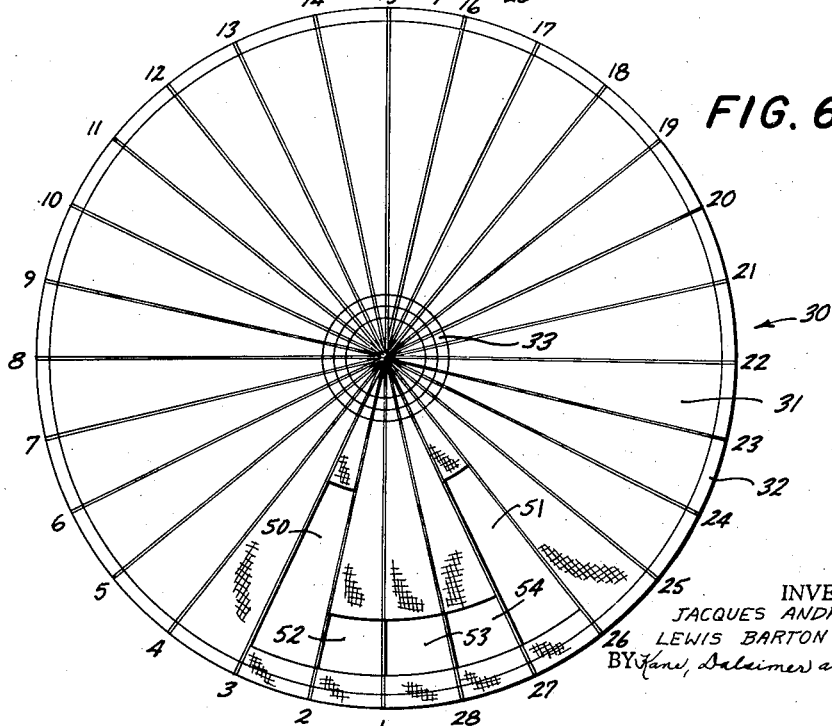
FIG. 6 is a top plan view of a further embodiment with apron sectors of adjacent gores removed to thereby define a different pattern of canopy opening.

A further embodiment is illustrated in FIG. 6 and includes a canopy 30 having a pair of relatively elongated and trapezoidal gore openings 50 and 51 spaced from one another and interconnected by means of reduced gore openings 52, 53 and 54. The component or horizontal thrust is naturally increased by the provision of these somewhat reduced gore openings 52, 53 and 54 which are located along the apron of canopy 30. When it is desired to make a clockwise turn, the chutist will pull down on the shroud line associated with seam 2 as well as the shroud line associated with seam 26 to obtain maximum effects. If a slower turn is desired, one or the other of these shroud lines may be pulled with varying degrees of force.

Normally with the increased area of canopy material removed, the rate of descent of the parachute would be increased, but a very low porosity design provides sufficient lift which together with optimum stability, forward speed and turning response renders this type of chute extremely advantageous for certain uses. Once again the length of gore openings may be varied depending upon the conditions and requirements. Optimum results should be obtained when employing a canopy material having a porosity of about 30 cubic feet per square foot per minute by forming the longer gore openings with a length approximating two-thirds of the gore length and the reduced gores having a length about one-fourth that of the gore length.

Thus, it should be apparent that relatively quick turning response, as well as increased rate of rotatability of the instant parachutes, is efficiently attained. Additionally, optimum steerability and directivity is possible resulting in a radially new principle in parachute design of achieving a lift component because of increased lateral thrust provided by increased area of canopy openings adjacent and extending along the canopy apron. In providing for increased canopy venting openings, canopy oscillation is dampened, thereby providing for a more stable descent. Of course, the contemplation of relatively low porosity material for the canopy provides for more variations in the channeling of air vented through the canopy to render it possible to obtain maximum parachute maneuverability.

Thus, among others, the several objects and advantages of the invention as aforenoted are achieved. Obviously, numerous changes in construction, dimensioning and location as well as number of gore openings may be resorted to without departing from the spirit of the invention as defined by the claims.

We claim:

1. A steerable parachute comprising a canopy having a skirt and apex and including a plurality of gores which have an apron sector, said canopy having a rear and front sector, two spaced gores being partially removed to provide two spaced unobstructed openings in said canopy for free passage therethrough of air compressed beneath said canopy during descent, said openings being substantially the same size, said openings being substantially symmetrically located at the rear part of said canopy, a series of suspension lines extending between adjoining gores, whereby a selective pull on a first suspension line attached to a point at one end of one of said openings produces a local deflection on the canopy resulting in rotation of the canopy in one direction, and a pull on a second suspension line attached to a point at one end of the other of said openings produces a local deflection of the canopy resulting in rotation of the canopy in the other direction, and opening means, including said first and second suspension lines, provides for a larger and variable effective passage of air by said openings while said canopy is inflated during descent, than it is ordinarily possible for said openings when said canopy is in a deflated condition, said openings being spaced by a gore having a larger elongated unobstructed opening intermediate the apex and skirt of said canopy for free passage therethrough of air compressed beneath said canopy during descent.

2. The invention in accordance with claim 1 wherein said canopy is formed from relatively low porosity material such that a substantial part of the air compressed beneath said canopy during descent exits through the openings in said canopy, and said canopy and openings therein being so constructed and arranged to cooperate and provide increased forward speed and a component of lift for said canopy during descent.

3. A steerable parachute comprising a canopy having a skirt and apex and including a plurality of gores which have an apron sector, said canopy having a rear and front sector, two spaced gores being partialy removed to provide two spaced unobstructed openings in said canopy for free passage therethrough of air compressed beneath said canopy during descent, said openings being substantially the same size, said openings being substantially symmetrically located at the rear part of said canopy, a series of suspension lines extending between adjoining gores, whereby a selective pull on a first suspension line attached to a point at one end of one of said openings produces a local deflection on the canopy resulting in rotation of the canopy in one direction, and a pull on a second suspension line attached to a point at one end of the other of said openings produces a local deflection of the canopy resulting in rotation of the canopy in the other direction, and said openings being elongated and spaced by at least one gore having a smaller unobstructed opening intermediate the apex and skirt of said canopy for providing free passage therethrough of air compressed beneath said canopy during descent.

4. The invention in accordance with claim 3 wherein said canopy is formed from relatively low porosity material such that a substantial part of the air compressed beneath said canopy during descent exits through the openings in said canopy, and said canopy and openings therein being so constructed and arranged to cooperate and provide increased forward speed and a component of lift for said canopy during descent.

5. A steerable parachute comprising a canopy having a skirt and apex and including a plurality of gores which have an apron sector, said canopy having a rear and front part, the major part of two spaced gores being removed to provide two spaced unobstructed elongated openings in said canopy for free passage therethrough of air compressed beneath said canopy during descent, said openings being spaced by the width of at least one gore, said openings being substantially the same size, said openings being substantially symmetrically located at the rear part of said canopy, and a series of suspension lines extending between adjoining gores, whereby a selective pull on a first suspension line attached to a point at one end of one of said openings produces a local deflection on the canopy resulting in rotation of the canopy in one direction, and a pull on a second suspension line attached to a point at one end of the other of said openings produces a local deflection of the canopy resulting in rotation of the canopy in the other direction.

6. The invention in accordance with claim 5 wherein said canopy is formed from relatively low porosity material such that a substantial part of the air compressed beneath said canopy during descent exits through the openings in said canopy, and said canopy and openings therein being so constructed and arranged to cooperate and provide increased forward speed and a component of lift for said canopy during descent.

7. A steerable parachute comprising a canopy having a skirt and apex and including a plurality of gores which have an apron sector, said canopy having a rear and front part, the major part of two spaced gores being removed to provide two spaced unobstructed elongated openings in said canopy for free passage therethrough of air compressed beneath said canopy during descent, said openings being substantially the same size, said openings being substantially symmetrically located at the rear part of said canopy, and a series of suspension lines extending between adjoining gores, whereby a selective pull on a first suspension line attached to a point at one end of one of said openings produces a local deflection on the canopy resulting in rotation of the canopy in one direction, and a pull on a second suspension line attached to a point at one end of the other of said openings produces a local deflection of the canopy resulting in rotation of the canopy in the other direction, and said openings being spaced by at least one gore having a smaller unobstructed opening intermediate the apex and skirt of said canopy for providing free passage therethrough of air compressed beneath said canopy during descent.

8. The invention in accordance with claim 7 wherein said canopy is formed from relatively low porosity material such that a substantial part of the air compressed beneath said canopy during descent exits through the openings in said canopy, and said canopy and openings therein being so constructed and arranged to cooperate and provide increased forward speed and a component of lift for said canopy during descent.

References Cited in the file of this patent

UNITED STATES PATENTS

| | | |
|---|---|---|
| 1,498,780 | Broadwick | June 24, 1924 |
| 1,685,688 | Thornblad | Sept. 25, 1928 |
| 1,777,441 | Malmer | Oct. 7, 1930 |
| 2,384,416 | Derry | Sept. 4, 1945 |
| 2,458,264 | Hart | Jan. 4, 1949 |
| 2,469,573 | Quilter | May 10, 1949 |
| 2,746,699 | Hart | May 22, 1956 |